(12) United States Patent
Malik

(10) Patent No.: US 7,737,850 B2
(45) Date of Patent: Jun. 15, 2010

(54) METHODS AND APPARATUS FOR LOCATIONING EMERGENCY PERSONNEL

(75) Inventor: Ajay Malik, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 273 days.

(21) Appl. No.: 11/831,444

(22) Filed: Jul. 31, 2007

(65) Prior Publication Data

US 2009/0033499 A1    Feb. 5, 2009

(51) Int. Cl.
*G08B 13/14* (2006.01)
(52) U.S. Cl. .................. 340/572.1; 340/10.1; 340/10.5
(58) Field of Classification Search .................. 340/572, 340/10, 505

See application file for complete search history.

(56) References Cited

U.S. PATENT DOCUMENTS

| | | | |
|---|---|---|---|
| 2002/0089434 A1* | 7/2002 | Ghazarian | 340/988 |
| 2004/0174269 A1* | 9/2004 | Miller et al. | 340/825.49 |
| 2007/0120671 A1* | 5/2007 | Carmichael et al. | 340/572.1 |
| 2007/0139191 A1* | 6/2007 | Quatro | 340/539.13 |
| 2008/0030359 A1* | 2/2008 | Smith et al. | 340/686.1 |
| 2009/0040041 A1* | 2/2009 | Janetis et al. | 340/539.13 |

* cited by examiner

*Primary Examiner*—Travis R Hunnings

(57) ABSTRACT

Systems and methods are provided for determining the location of an individual (e.g., emergency personnel) within an environment. A system includes a wearable RFID tag removably attached to the individual (e.g., on his/her wrist, or uniform), wherein the wearable RFID tag is configured to send data to one or more access ports positioned external to the environment (e.g., on a fire truck or other such vehicle). A locationing module is communicatively coupled to the access port and is configured to determine the location of the individual within the site based on the data acquired from the wearable RFID tag.

18 Claims, 1 Drawing Sheet

US 7,737,850 B2

METHODS AND APPARATUS FOR LOCATIONING EMERGENCY PERSONNEL

TECHNICAL FIELD

The present invention relates generally to radio frequency identification (RFID) systems, wireless local area networks (WLANs), and other such networks incorporating RF tags, and, more particularly, to methods of determining the location of emergency personnel such as firemen, policemen, and the like within an building or other site.

BACKGROUND

In many instances it is desirable to know the location of an individual or individuals within a building or other such site. This is particularly the case with emergency response personnel such as policemen, firemen and the like, as these individuals are often operating in the context of dangerous conditions such as fires, floods, or other conditions where knowledge of the individual's position would help coordinate efforts to resolve the emergency. While it is common for such personnel to utilize radios and other communication equipment in emergencies, due to the exigencies of an actual emergency, the information transmitted by emergency personnel can be intermittent and/or inaccurate.

In recent years, Radio frequency identification (RFID) systems have achieved wide popularity in a number of applications, as they provide a cost-effective way to track the location of a large number of assets in real time. In large-scale application such as warehouses, retail spaces, and the like, many types of tags may exist in the environment (or "site"). Likewise, multiple types of readers, such as RFID readers, active tag readers, 802.11 tag readers, Zigbee tag readers, etc., are typically distributed throughout the space in the form of entryway readers, conveyer-belt readers, mobile readers, etc., and may be linked by network controller switches and the like.

While it is common for RFID tags to be distributed throughout a commercial space to track assets, the tags are not been deployed in a way that would assist in tracking individuals within the environment as would be required by emergency personnel. Furthermore, emergency personnel are not equipped to read such tags and process the information in a way that would assist them in any meaningful manner. Furthermore, GPS systems may not work in certain environments, and can not generally provide accurate 3-dimensional information.

Accordingly, it is desirable to provide improved methods and systems for determining the location of firemen, policemen, and other emergency personnel in environments where no personnel-locationing RFID infrastructure has been deployed. Furthermore, other desirable features and characteristics of the present invention will become apparent from the subsequent detailed description and the appended claims, taken in conjunction with the accompanying drawings and the foregoing technical field and background.

BRIEF SUMMARY

The present invention provides systems and methods for determining the location of an individual (e.g., emergency personnel) within a site. One embodiment of the method includes providing the individual with a wearable active RFID tag that transmits data to multiple wireless access ports (APs) external to the environment. The location of the individual is determined via a locationing algorithm applied based upon, for example, the strength of the signal received from the RFID tag by the multiple APs.

A system in accordance with one embodiment includes a wearable active tag removably attached to the individual (e.g., on his/her wrist, or uniform), and one or more APs positioned external to the site and configured to receive the data from the wearable RFID tag. A locationing module is communicatively coupled to the access port and is configured to determine the location of the individual within the site based on the data acquired from the wearable RFID tag.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
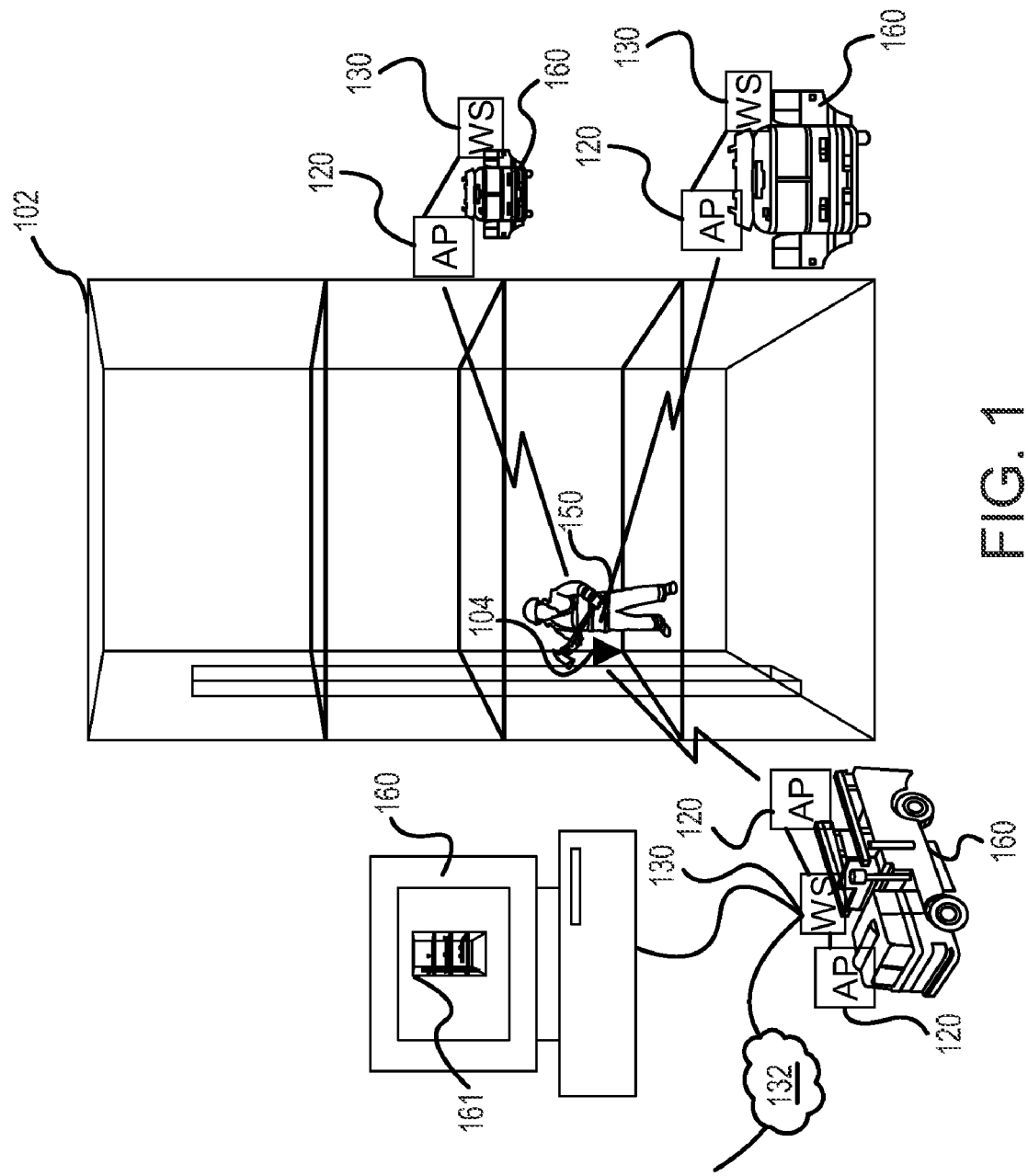
FIG. 1 is a conceptual overview of a system in accordance with an exemplary embodiment of the present invention.

The following detailed description is merely exemplary in nature and is not intended to limit the range of possible embodiments and applications. Furthermore, there is no intention to be bound by any theory presented in the preceding background or the following detailed description.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to assist improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The embodiments of the invention described herein are, for example, capable of use in sequences other than those illustrated or otherwise described herein. Unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

The terms "comprise," "include," "have" and any variations thereof are used synonymously to denote non-exclusive inclusion. The terms "left," "right," "in," "out," "front," "back," "up," "down," and other such directional terms are used to describe relative positions, not necessarily absolute positions in space. The term "exemplary" is used in the sense of "example," rather than "ideal."

For the sake of brevity, conventional techniques related to signal processing, data transmission, signaling, network control, the 802.11 family of specifications, wireless networks, RFID systems and specifications, and other functional aspects of the system (and the individual operating components of the system) may not be described in detail herein. Furthermore, the connecting lines shown in the various figures contained herein are intended to represent example functional relationships and/or physical couplings between the various elements. Many alternative or additional functional relationships or physical connections may be present in a practical embodiment.

The present invention generally relates to systems and methods for locating emergency personnel such as firemen, policemen, and the like in a building or other site where RFID tags have not been previously deployed. Referring now to FIG. 1, an example environment useful in describing the present invention generally includes a building or other site 102 (alternatively referred to as an "environment"), emergency personnel 150, and associated vehicles 160. In this example, the vehicles 160 (e.g., fire trucks, etc.) and personnel 150 have responded to an alarm or other request at site 102. Vehicles 160 are located external to site 102, while personnel 150 moves through site 102, examining the environment and addressing any emergency concerns as appropriate. Note that while a three-dimensional, multi-floored building is illustrated in FIG. 1, the invention is not so limited. Site 102 may be any two-dimensional or three-dimensional space with or without buildings and other structures. Example sites include, for example, single-story buildings, school campuses, high-rise buildings, commercial buildings, etc.

In general, as described in further detail below, personnel 150, while moving through site 102, carries a wearable active RFID tag 104 that suitably sends its tag data to one or more access ports (APs) 120 and wireless switches 130 located on vehicles 160. A locationing algorithm is applied to the various signals received by APs 120 from tag 104 based, for example, on RSSI and/or another signal strength matrix. Various software and hardware (e.g., computer 160, etc.) produce a display 161 indicative of the position of personnel 150 within site 102.

Tag 104, which may be of various types, are read by wearable APs 120 when personnel 150 is within range, as is known in the art. Note that the term "RFID" is not meant to limit the invention to any particular type of tag. The term "tag" refers, in general, to any RF element that can be communicated with and has an ID (or "ID signal") that can be read by another component. In general, RFID tags (sometimes referred to as "transponders") may be classified as either active, passive, or semi-active. Active tags are devices that incorporate some form of power source (e.g., batteries, capacitors, or the like) and are typically always "on," while passive tags are tags that are exclusively energized via an RF energy source received from a nearby antenna. Semi-active tags are tags with their own power source, but which are in a standby or inactive mode until they receive a signal from an external RFID reader, whereupon they "wake up" and operate for a time just as though they were active tags. While active tags are more powerful, and exhibit a greater range than passive tags, they also have a shorter lifetime and are significantly more expensive. Such tags are well known in the art, and need not be described in detail herein.

RFID tag 104 may be worn by personnel 110 in any suitable manner. In one embodiment, tag 104 is removeably attached to the body of personnel 110—e.g., a wristband, a necklace, or the like. In another embodiment, tag 104 is incorporated directly into the clothing or uniform of personnel 110—e.g., within a pocket, hat, etc. worn by personnel 110.

Each antenna within APs 120 has an associated RF range (or, in the context of reading active RFID tags, a "read point"), which depends upon, among other things, the strength of the respective antenna. The read point corresponds to the area around the antenna in which a tag 104 may be read by that antenna, and may be defined by a variety of shapes, depending upon the nature of the antenna. It is not uncommon for RF ranges or read points to overlap in real-world applications (e.g., doorways, small rooms, etc.).

Within vehicle 160, switching device 130 (alternatively referred to as an "RF switch," "WS," or simply "switch") may be coupled to a network 132 (e.g., a WiFi network coupled to one or more other networks or devices) and communicates with one or more software applications (not shown). Wireless access ports 120 (alternatively referred to as "access ports" or "APs") are configured to wirelessly communicate with tag 104. APs 120 suitably communicate with switch 110 via appropriate communication lines (e.g., conventional Ethernet lines, or the like). Any number of additional and/or intervening switches, routers, servers and other network components may also be present in the system.

A particular AP 120 may communicate with multiple tags 104 (e.g., when multiple personnel 150 are located within site 102). One or more APs 120 may be coupled to a single switch 110, as illustrated, and may be distributed in any advantageous manner internal to or external to vehicle 160. For example, in the case of a ladder truck, it is possible to deploy one AP 120 near the cab of the vehicle, and a second AP 120 at the end of the ladder, which might be advantageous in situations where the ladder is extended upward in a rescue scenario. In general, RF Switch 110 determines the destination of packets it receives and routes those packets to the appropriate AP 120 Thus, each AP 120 acts primarily as a conduit, sending/receiving RF transmissions via MUs 130, and sending/receiving packets via a network protocol with WS 110.

WS 130 and AP 120 may support any number of tags that use wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. As described in further detail below, switch 102 includes hardware, software, and/or firmware capable of carrying out the functions described herein. Thus, switch 102 may comprise one or more processors accompanied by storage units, displays, input/output devices, an operating system, database management software, networking software, and the like. Such systems are well known in the art, and need not be described in detail. Switch 102 may be configured as a general purpose computer, a network switch, or any other such network host. In a preferred embodiment, controller 102 is modeled on a network switch architecture but includes RF network controller software (or "module") whose capabilities include, among other things, the ability to allow configure and monitor readers 108 and antennas 106.

Locationing of personnel 150 involves examining the signal strength (e.g., RSSI) from tag 104 to each AP 120 and then using rules and a locationing algorithm to determine the most likely location of the tag associated therewith. More generally, location determination may involve various ranging techniques to determine symbolic distance or range measurement coupled with position estimation techniques that derive position estimates from collection of reference points and their associated range measurements. For ranging techniques, the distance of the object is computer from the AP 120 as a proportion of effective RSSI, where effective RSSI is the RSSI as seen by AP 120 adjusted for facility layout, fingerprinting info if available, runtime RF environmental characteristics as available from the AP (Signal to noise ratio, AP to AP beacon, AP power, etc). At that point standard triangulation may be used as the position estimation technique. As is known in the art, with respect to triangulation, if the distance to three known locations is known, the absolute position in space can be determined by the section of the three circles around these locations.

In accordance with one embodiment, the system is configured to reconcile the location of personnel 150 based on a pre-defined floor map and or a zone map, and produce a graphical representation 161 indicating the position of personnel 150 within site 102. This information may be transmitted to a base station (e.g., control center, etc.) through network 132. Any such map and zone information may be preloaded in vehicle 160, downloaded over network 132, or received from site 102 upon arrival. Stated another way, the IDs for each tag 104, and their respective locations, are preferably known prior to beginning the locationing process; however, this knowledge may be distributed over a number of systems and networks.

It should be appreciated that the example embodiment or embodiments described herein are not intended to limit the scope, applicability, or configuration of the invention in any way. For example, these methods may be used in connection with standard barcode readers and the like. In general, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A method for determining the location of an individual within a site, comprising:
   providing the individual with a wearable RFID tag;
   transmitting data from the RFID tag to a plurality of wireless access ports external to the site; and
   determining the location of the individual within the site based on a location algorithm utilizing the data acquired from the RFID tag, wherein the location algorithm utilizes the plurality of wireless access ports and the data acquired from the RFID tag to determine the location,
   wherein transmitting the data to the plurality of wireless access ports includes transmitting the data to access ports on one or more vehicles located external to the site; and wherein the location algorithm is configured to determine a distance between the RFID tag and one or more of the wireless access ports through an effective received signal strength indication (RSSI), the effective RSSI comprises RSSI seen by one of the wireless access ports adjusted for site layout, fingerprinting info, and runtime radio frequency environmental characteristics comprising signal to noise ratio, access port to access port beacon, and access port power.

2. The method of claim 1, wherein providing the individual with a wearable RFID tag includes providing an active RFID tag.

3. The method of claim 1, wherein transmitting the data includes transmitting information associated with the identity of the individual.

4. The method of claim 1, wherein determining the location includes determining the location utilizing a locationing module located on the vehicle and in communication with the access ports.

5. The method of claim 1, further including providing a display configured to provide a graphical representation of the location of the individual within the site; and
   performing one of selecting a preloaded map and downloading a map of the site.

6. The method of claim 1, further including transmitting the data to a central office communicatively coupled to a wireless switch that is communicatively coupled to the access ports.

7. A system for determining the location of an individual within a site, comprising:
   a wearable RFID tag removeably attached to the individual, the wearable RFID tag configured to transmit tag data;
   a plurality of access ports external to the site, the access ports configured to receive the data from the wearable RFID tag; and
   a locationing module communicatively coupled to the plurality of access ports, the locationing module configured to execute a location algorithm to determine the location of the individual within the site based on the data acquired from the wearable RFID tag, wherein the location algorithm utilizes reference data between the wearable RFID tag and one or more of the plurality of access ports to determine the location,
   wherein the locationing module utilizes the signal strengths of the respective signals received by each of the plurality of wireless access ports from the wearable RFID tag, wherein the signal strengths each comprise effective received signal strength indication (RSSI), the effective RSSI comprises RSSI seen by one of the wireless access ports adjusted for site layout, fingerprinting info, and runtime radio frequency environmental characteristics comprising signal to noise ratio, access port to access port beacon, and access port power.

8. The system of claim 7, wherein the RFID tag is an active RFID tag.

9. The system of claim 7, wherein the data acquired from the RFID tag includes information associated with the identity of the individual.

10. The system of claim 7, wherein at least one of the plurality of wireless access ports is located within a vehicle external to the site.

11. The system of claim 10, wherein the vehicle is an emergency vehicle.

12. The system of claim 11, wherein the emergency vehicle is a fire response vehicle or a police vehicle having at least two of the access ports located therein.

13. The system of claim 10, wherein the locationing module is located on the vehicle.

14. The system of claim 7, further including a display configured to provide a graphical representation of the location of the individual within the site.

15. A system comprising a wearable RFID tag configured to transmit tag data to a plurality of access ports located on one or more vehicles external to a site, and a locationing module coupled to the access ports that uses signal strength calculations associated with the tag data received by the plurality of access ports to determine the location of the wearable RFID tag within the site, wherein the signal strength calculations comprise effective received signal strength indication (RSSI), the effective RSSI comprises RSSI seen by one of the access ports adjusted for site layout, fingerprinting info, and runtime radio frequency environmental characteristics comprising signal to noise ratio, access port to access port beacon, and access port power.

16. The system of claim 15, wherein the wearable RFID tag is configured to be worn on the individual's wrist or placed within a uniform worn by the individual.

17. The system of claim 15, wherein the vehicle is an emergency vehicle having a second access port.

18. The system of claim 16, wherein the vehicle is a fire response vehicle having a cab portion and a ladder portion, wherein the first access port is located adjacent to the cab portion, and the second access port is located adjacent the ladder portion.

* * * * *